(12) United States Patent
Bryan-Brown et al.

(10) Patent No.: US 7,280,175 B2
(45) Date of Patent: *Oct. 9, 2007

(54) LIQUID CRYSTAL DEVICE EXHIBITING ZERNITHAL BISTABILITY AND A CELL WALL FOR SUCH A DEVICE

(75) Inventors: Guy Peter Bryan-Brown, Malvern (GB); Carl Vernon Brown, Malvern (GB); John Clifford Jones, Malvern (GB)

(73) Assignee: ZBD Displays Limited, Malvern (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/775,342

(22) Filed: Feb. 11, 2004

(65) Prior Publication Data

US 2005/0062919 A1 Mar. 24, 2005

Related U.S. Application Data

(60) Continuation of application No. 10/212,141, filed on Aug. 6, 2002, now Pat. No. 6,714,273, which is a division of application No. 09/740,260, filed on Dec. 20, 2000, now Pat. No. 6,456,348, which is a division of application No. 09/043,788, filed on Mar. 30, 1998, now Pat. No. 6,249,332.

(30) Foreign Application Priority Data

Oct. 16, 1995 (GB) .................................. 9521106.6

(51) Int. Cl.
*G02F 1/1337* (2006.01)
(52) U.S. Cl. ...................... 349/129; 349/123; 349/124; 349/128; 349/136
(58) Field of Classification Search ............... 349/128, 349/129, 134
See application file for complete search history.

(56) References Cited

U.S. PATENT DOCUMENTS 4,333,708 A 6/1982 Boyd et al. ................. 350/346

(Continued)

OTHER PUBLICATIONS

Bryan-Brown et al, "Bistable Nematic Alignment using Bigratings", Conference Record of the 1994 International Display Research conference and International Workshops on Active Mararxi LCDs and Display Materials, p. 209-212, 1994.

(Continued)

*Primary Examiner*—Andrew Schechter
(74) *Attorney, Agent, or Firm*—Nixon & Vanderhye P.C.

(57) ABSTRACT

A bistable nematic liquid crystal device cell is provided with a surface alignment grating on at least one cell wall and a surface treatment on the other wall. Such treatment may be a homeotropic alignment or a planar alignment with or without an alignment direction, and zero or a non zero pretilt. The surface profile on the monograting is asymmetric with its groove height to width selected to give approximately equal energy within the nematic material in its two allowed alignment arrangements. The monograting may be formed by a photolithographic process or by embossing of a plastics material. The cell is switched by dc pulses coupling to a flexoelectric coefficient in the material, or by use of a two frequency addressing scheme and a suitable two frequency material. Polarisers either side of the cell distinguish between the two switched states. The cell walls may be rigid or flexible, and are coated with electrode structures, e.g. in row and column format giving an x,y matrix of addressable pixels on the cell.

21 Claims, 7 Drawing Sheets

U.S. PATENT DOCUMENTS

| | | | |
|---|---|---|---|
| 4,486,760 A * | 12/1984 | Funada et al. | 347/256 |
| 4,775,225 A * | 10/1988 | Tsuboyama et al. | 349/155 |
| 4,973,138 A * | 11/1990 | Yamazaki et al. | 349/157 |
| 5,268,782 A * | 12/1993 | Wenz et al. | 349/156 |
| 5,280,375 A * | 1/1994 | Tsuda et al. | 349/128 |
| 5,357,358 A | 10/1994 | Durand et al. | 359/76 |
| 5,384,650 A | 1/1995 | TeKolste et al. | 359/55 |
| 5,754,264 A | 5/1998 | Bryan-Brown et al. | 349/123 |
| 5,764,325 A | 6/1998 | Bryan-Brown et al. | 349/128 |
| 5,796,459 A | 8/1998 | Bryan-Brown et al. | 349/128 |
| 5,831,700 A * | 11/1998 | Li et al. | 349/88 |
| 6,249,332 B1 | 6/2001 | Bryan-Brown et al. | 349/129 |
| 6,456,348 B2 * | 9/2002 | Bryan-Brown et al. | 349/129 |
| 6,696,110 B1 * | 2/2004 | Tuffin et al. | 428/1.1 |
| 6,714,273 B2 * | 3/2004 | Bryan-Brown et al. | 349/129 |
| 7,053,975 B2 * | 5/2006 | Wood et al. | 349/177 |

OTHER PUBLICATIONS

Barberi et al, "Intrnisic Multiplexability of Surface Bistable Nematic Displays", Appl. Phys. Lett. 62 (25), pp. 3270-3272, Jun. 1993.

Nobili et al, "Surface Walls on a Bistable Anchoring of Nematic Liquid Crystals", Journal Phys, II, France vil. 5, pp. 531-560, Apr. 1995.

* cited by examiner

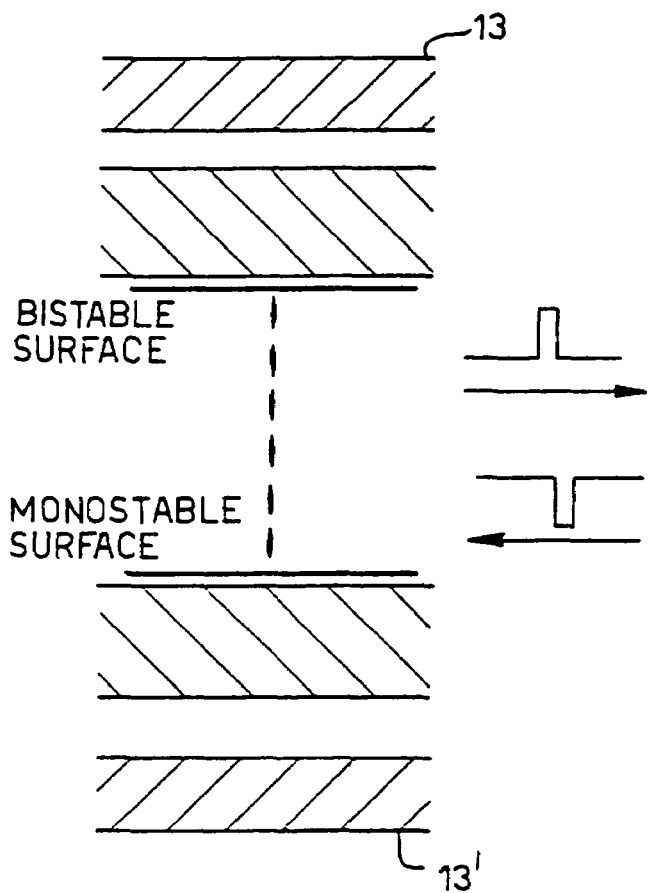
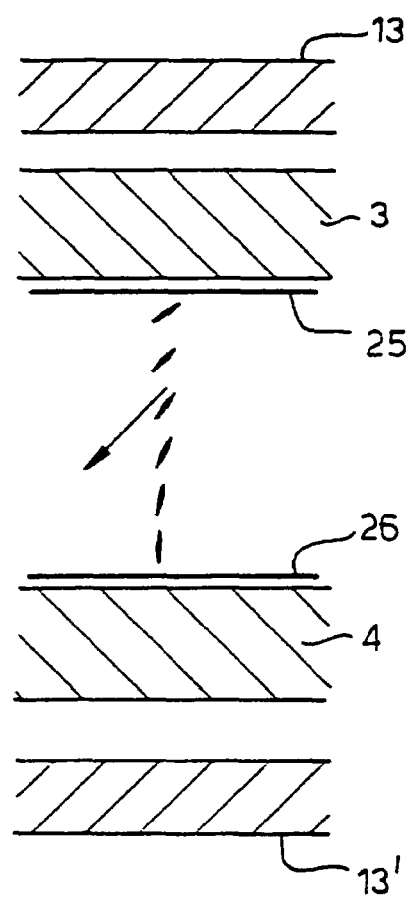
Fig. 7a. Fig. 7b.
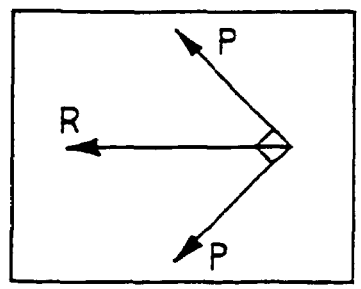

Fig.8.
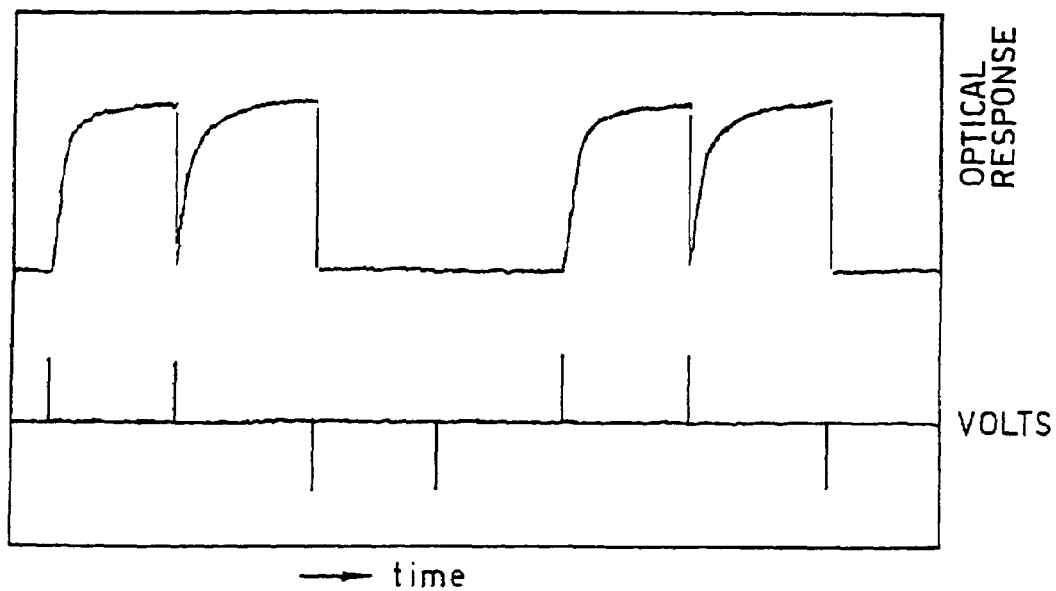
Fig.10a. Fig.10b.
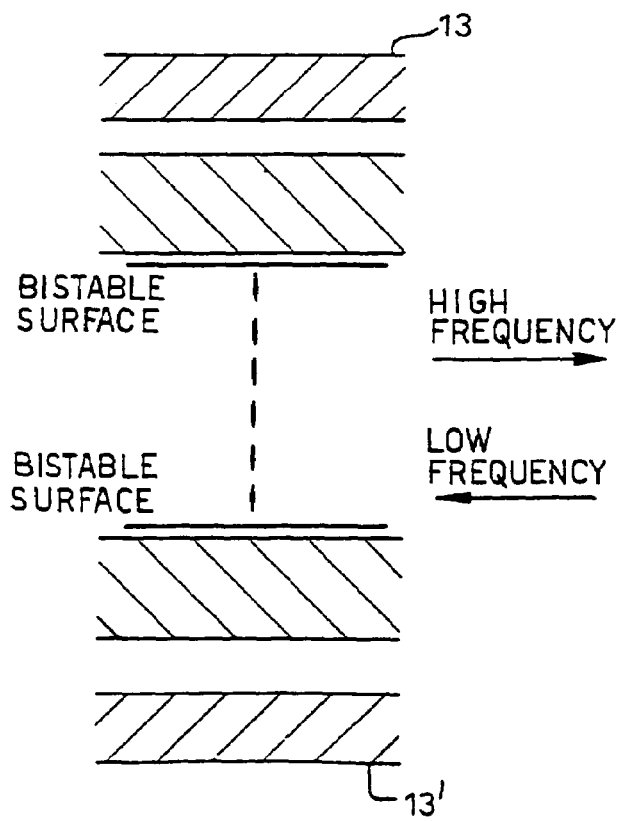 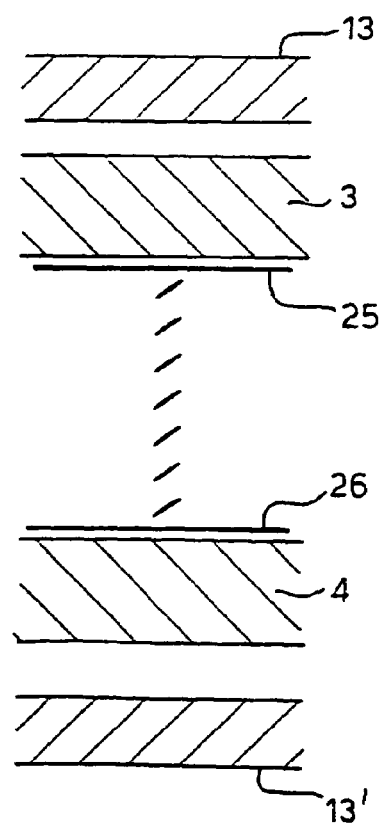

RESULTANT
VOLTAGE
AT PIXEL A

▨ BLANKING PULSE, OPENS
   LINE FOR ADDRESSING
■ SELECTION PULSE
☐ RESTORES dc BALANCE

LIQUID CRYSTAL DEVICE EXHIBITING ZERNITHAL BISTABILITY AND A CELL WALL FOR SUCH A DEVICE

This application is a Continuation of application Ser. No. 10/212,141, filed Aug. 6, 2002, now U.S. Pat. No. 6,714,273, which is a Division of application Ser. No. 09/740,260, filed Dec. 20, 2000, now U.S. Pat. No. 6,456,348, which is a Division of application Ser. No. 09/043,788, filed Mar. 30, 1998, now U.S. Pat. No. 6,249,332, which is the U.S. national phase of International Application No. PCT/GB96/02463, filed 9 Oct. 1996, which designated the U.S., the entire content of which is hereby incorporated by reference in this application.

This invention relates to bistable nematic liquid crystal devices.

Liquid crystal devices typically comprise a thin layer of a liquid crystal material contained between cell walls. Optically transparent electrode structures on the walls allow an electric field to be applied across the layer causing a re-ordering of the liquid crystal molecules.

There are three known types of liquid crystal material, nematic, cholesteric, and smectic each having a different molecular ordering. The present invention concerns devices using nematic materials.

In order to provide displays with a large number of addressable elements it is common to make the electrodes as a series of row electrode on one wall and a series of column electrodes on the other cell wall. These form e.g. an x, y matrix of addressable elements or pixels and, for twisted nematic types of devices, are commonly addressed using rms. addressing methods.

Twisted nematic and phase change type of liquid crystal devices are switched to an ON state by application of a suitable voltage, and allowed to switch to an OFF state when the applied voltage falls below a lower voltage level, i.e. these devices are monostable. For a twisted nematic type of device (90° or 270° degree twist as in U.S. Pat. No. 4,596,446), the number of elements that can be rms. addressed is limited by the steepness of a device transmission vs voltage curve as details by Alt and Pleschko in IEEE Trans ED vol ED 21 1974 pages 146-155. One way of improving the number of pixels is to incorporate thin film transistors adjacent each pixel; such displays are termed active matrix displays. An advantage of nematic type of devices is the relatively low voltage requirements. They are also mechanically stable and have wide temperature operating ranges. This allows construction of small and portable battery powered displays.

Another way of addressing large displays is to use a bistable liquid crystal device. Ferroelectric liquid crystal displays can be made into bistable device with the use of smectic liquid crystal materials and suitable cell wall surface alignment treatment. Such a device is a surface stabilised ferroelectric liquid crystal device (SSFELCDs) as described by:—L J Yu, H Lee, C S Bak and M M Labes, Phys Rev Lett 36, 7, 388 (1976); R B Meyer, Mol Cryst Liq Cryst. 40, 33 (1977); N A Clark and S T Lagerwall, Appl Phys Lett, 36, 11, 899 (1980). One disadvantage of ferroelectric devices is the relatively large voltage needed to switch the material. This high voltage makes small portable, battery powered displays expensive. Also these displays suffer from other problems such as lack of shock resistance, limited temperature range and also electrically induced defects such as needles.

If bistable surface anchoring can be achieved using nematics then a display can be made which has the merits of both the above mentioned technologies but none of the problems.

It has already been shown by Durand et al that a nematic can be switched between two alignment states via the use of chiral ions or flexoelectric coupling: A Charbi, R Barberi, G Durand and P Martinot-Largarde, Patent Application No WO 91/11747, (1991) "Bistable electrochirally controlled liquid crystal optical device", G Durand, R Barberi, M Giocondo, P Martinot-Largarde, Patent Application No WO 92/00546 (1991) "Nematic liquid crystal display with surface bistability controlled by a flexoelectric effect". These are summarised as follows:

In Patent Application No WO 91/11747 a device is described with the following characteristics:

1. The cell is made using two surfaces which have SiO coatings of appropriate thickness and evaporation angle to allow two stable states to exist on each surface. Furthermore the two states on a surface are designed to differ in azimuthal angle by 45° and the surfaces are oriented to differ in azimuthal angle by 45° and the surfaces are oriented such that each of the two resulting domains are untwisted.

2. The cell (of 6 µm thickness) is filled with 5CB doped with 0.5% benzyl quininium bromide and 1.8% phenyl lactic acid. The former is an electrically positive chiral ion with left hand twist while the latter is a negative chiral ion with a right hand twist. The concentrations ensure that the final mixture has a very long pitch so that the states in the thin cell are uniform.

3. Application of a 110V dc pulse for 40 µs enabled switching between the two states. A lower threshold is observed for longer pulse e.g. an 80V threshold is observed for 300 µs pulses.

4. Addition of suitably oriented polarisers caused one state to appear black while the other appears white with a contrast ratio of about 20.

5. A variant device is also mentioned which causes a short pitch chiral ion mixture between monostable surfaces which possess different zenithal anchoring energies. Switching between a 180° twisted state and a uniform state is observed in a 4 µm cell for pulses over 50V.

In Patent Application WO 92/00546 a device is described with the following characteristics:

The cell is made using two surfaces which have SiO coatings of appropriate thickness and evaporation angle to allow two stable states to exist on each surface. Furthermore the two states on a surface are designed to differ in azimuthal angle by 45° and the surfaces are oriented such that each of the two resulting domains are untwisted.

The surfaces are also oriented in such a way that the pretilted state on one surface lines up with the untilted state on the other surface and vice versa. Hence when filled with 5CB, the two states are seen as shown in FIGS. 7B and 7C.

Application of a 14V dc pulse across a 1 µm cell for 100 µs allows switching between the states. The final state is dependent on the sign of the pulse due to its coupling to the flexoelectric polarisation. The same voltage threshold is observed for switching in both directions.

The surface used by Durand to obtain bistable alignment was a thin layer of SiO evaporated at a precise oblique angle. However this method suffers the disadvantage that any deviation in the evaporation angle, layer thickness or indeed any of the deposition parameters is likely to produce a surface with only monostable alignment. This makes the oblique evaporation technique unsuitable, or very difficult, for large area displays.

U.S. Pat. No. 4,333,708 describes a multistabl liquid crystal device in which cell walls are profiled to provide an array of singular points. Such substrate configurations provide multistable configurations of the director alignments because disclination must be moved to switch between stable configurations. Switching is achieved by application of electric fields.

Another bistable nematic device is described in GB.2, 286,467-A. This uses accurately formed bigratings on at least one cell wall. The bigrating permits liquid crystal molecules to adopt two different angular aligned directions when suitable electrical signals are applied to cell electrodes, e.g. dc coupling to flexoelectric polarisation as described in Patent Application No. WO.92/00546. Since in the two splayed state the director is quite close to being in the plane of the layer, the coupling between director and flexoelectric component can be small, which may hinder switching in some circumstances.

According to this invention the above disadvantages are overcome by a surface treatment to at least one cell wall that permits nematic liquid crystal molecules to adopt either of two pretilt angles in the same azimuthal plane. The cell can be electrically switched between these two states to allow information display which can persist after the removal of power.

The term same azimuthal plane is explained as follows; let the walls of a cell lie in the x,y plane, which means the normal to the cell walls is the z axis. Two pretilt angles in the same azimuthal plane means two different molecular positions in the same x,z plane According to this invention a bistable nematic liquid crystal device comprises;

two cell walls enclosing a layer of liquid crystal material; electrode structures on both walls;

a surface alignment on the facing surfaces of both cell walls providing alignment to liquid crystal molecules;

means for distinguishing between switched states of the liquid crystal material:

CHARACTERISED BY a surface alignment grating on at least one cell wall that permits the liquid crystal molecules to adopt two different pretilt angles in the same azimuthal plane;

the arrangement being such that two stable liquid crystal molecular configurations can exist after suitable electrical signals have been applied to the electrodes.

The grating may have a symmetric or an asymmetric groove profile.

The grating may have an asymmetric groove profile which will induce a pretilt of less than 90°, e.g. 50° to 90°. An asymmetric profile may be defined as a surface for which there does not exist a value of h such that;

$$\Psi_x(h-x)=\Psi_x(h+x) \qquad (1)$$

for all values of x, where $\Psi$ is the function describing the surface.

The gratings may be applied to both cell walls and may be the same or different shape on each wall. Furthermore the grating profile may vary within each pixel area, and or in the inter pixel gaps between electrodes. One or both cell walls may be coated with a surfactant such as lethecin.

The liquid crystal material may be non twisted in one or both stable molecular configurations.

The cell walls may be formed of a relatively thick non flexible material such as a glass, or one or both cells walls may be formed of a flexible material such as a thin layer of glass or a plastic material flexible e.g. polyolefin or polypropylene. A plastic cell wall may be embossed on its inner surface to provide a grating. Additionally, the embossing may provide small pillars (e.g. of 1-3 μm height and 5-50 μm or more width) for assisting in correct spacing apart of the cell walls and also for a barrier to liquid crystal material flow when the cell is flexed. Alternatively the pillars may be formed by the material of the alignment layers.

The grating may be a profiled layer of a photopolymer formed by a photolithographic process e.g. M C Hutley, Diffraction Gratings (Academic Press, London 1982) p 95-125; and F Horn, Physics World, 33 (March 1993). Alternatively, the bigrating may be formed by embossing; M T Gale, J Kane and K Knop, J App. Photo Eng, 4, 2, 41 (1978), or ruling; E G Loewen and R S Wiley, Proc SPIE, 88 (1987), or by transfer from a carrier layer.

The electrodes may be formed as a series of row and column electrodes arranged and an x,y matrix of addressable elements or display pixels. Typically the electrodes are 200 μm wide spaced 20 μm apart.

Alternatively, the electrodes may be arranged in other display formats e.g. r-θ matrix or 7 or 8 bar displays.

The invention will now be described, by way of example only with reference to the accompanying drawings of which;

FIG. 7 shows a cross section of a cell configuration which allows bistable switching between the two states.

FIG. 8 shows the transmission of the cell and the applied signals as a function of time.

FIG. 10 shows an alternative cell configuration for bistable switching.

Figure 1:
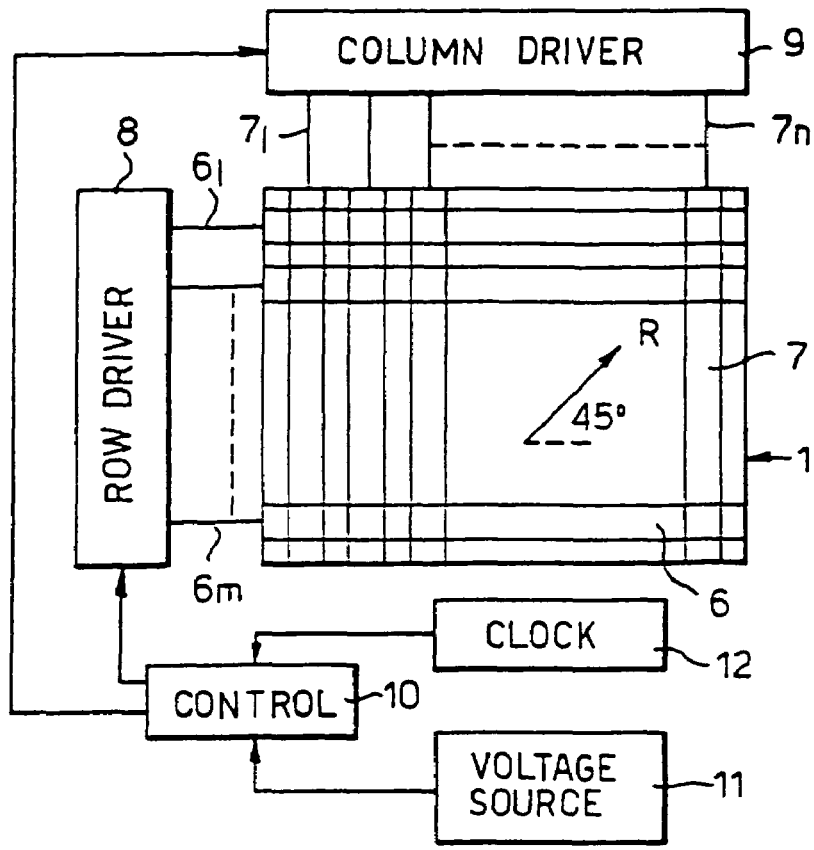
FIG. 1 is a plan view of a matrix multiplexed addressed liquid crystal display.
Figure 2:
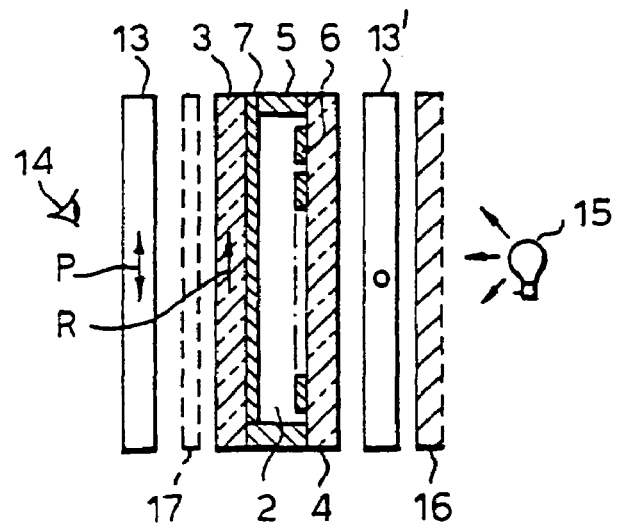
FIG. 2 is the cross section of the display of FIG. 1.

The display in FIGS. 1, 2 comprises a liquid crystal cell 1 formed by a layer 2 of nematic or long pitch cholesteric liquid crystal material contained between glass walls 3, 4. A spacer ring 5 maintains the walls typically 1-6 μm apart. Additionally numerous beads of the same dimensions may be dispersed within the liquid crystal to maintain an accurate wall spacing. Strip like row electrodes 6 e.g. of $SnO_2$ or ITO (indium tin oxide) are formed on one wall 3 and similar column electrodes 7 are formed on the other wall 4. With m-row and n-column electrodes this forms an m×n matrix of addressable elements or pixels. Each pixel is formed by the intersection of a row and column electrode.

A row driver 8 supplies voltage to each row electrode 6. Similarly a column driver 9 supplies voltages to each column electrode 7. Control of applied voltages is from a control logic 10 which receives power from a voltage source 11 and timing from a clock 12.

Either side of the cell 1 are polarisers 13, 13' arranged with their polarisation axis substantially crossed with respect to one another and at an angle of substantially 45° to the alignment directions R, if any, on the adjacent wall 3, 4 as described later. Additionally an optical compensation layer 17 of e.g. stretched polymer may be added adjacent to the liquid crystal layer 2 between cell wall and polariser.

A partly reflecting mirror 16 may be arranged behind the cell 1 together with a light source 15. These allow the display to be seen in reflection and lit from behind in dull ambient lighting. For a transmission device, the mirror 16 may be omitted.

Prior to assembly, at least one of the cell walls 3, 4 are treated with alignment gratings to provide a bistable pretilt. The other surface may be treated with either a planar (i.e. zero or a few degrees of pretilt with an alignment direction) or homeotropic monostable surface, or a degenerate planar surface (i.e. a zero or few degrees of pretilt with no alignment direction).

Finally the cell is filled with a nematic material which may be e.g. E7, ZLI2293 or TX2A (Merck).

An example method used to fabricate the grating surface will now described with reference to FIG. 3.

EXAMPLE 1:

A piece of ITO coated glass to form the cell wall 3, 4 was cleaned with acetone and isopropanol and was then spin coated with photoresist (Shipley 1805) at 3000 rpm for 30 seconds giving a coating thickness of 0.55 µm. Softbaking was then carried out at 90° C. for 30 minutes.

Figure 3:
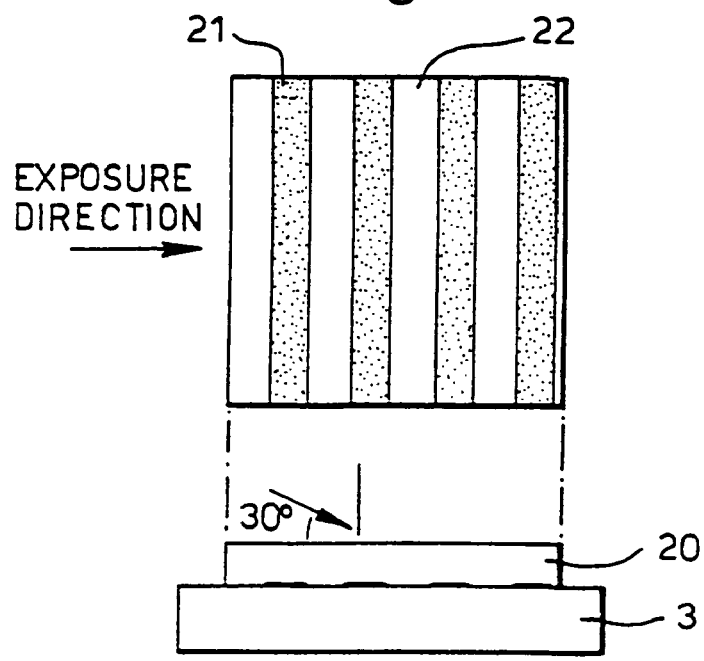
FIG. 3 shows a top view and a side view of the mask and exposure geometry used to produce a grating surface.

A contact exposure was then carried out on the coated wall 3, 4 using a chrome mask 20 containing 0.5 µm lines 21 and 0.5 µm gaps 22 (hence an overall pitch of 1 µm) as shown in FIG. 3. The exposure was carried out at non-normal incidence, in this case an angle of 60° was used. Mask 20 orientation is such that the groove direction is substantially perpendicular to the to plane of incidence as shown in FIG. 3. Exposure in this geometry leads to an asymmetric intensity distribution and therefore an asymmetric grating profile (see for example B. J. Lin, J. Opt. Soc. Am., 62, 976 (1972)). Coated cell walls 3, 4 were exposed to light from a mercury lamp (Osram Hg/100) with an intensity of 0.8 mW/cm² for a period of about 40 to 180 seconds as detailed later.

After the exposure the coated cell wall 3, 4 was released from the mask 20 and developed in Shipley MF319 for 10 seconds followed by a rinse in de-ionised water. This left the cell wall's surface patterned with an asymmetric surface modulation forming the desired grating profile. The photoresist was then hardened by exposure to deep UV radiation (254 nm) followed by baking at 160° C. for 45 minutes. This was done to ensure insolubility of the photoresist in the liquid crystal. Finally the grating surface is treated with a solution of the surfactant lecithin in order to induce a homeotropic boundary condition.

Figure 4:
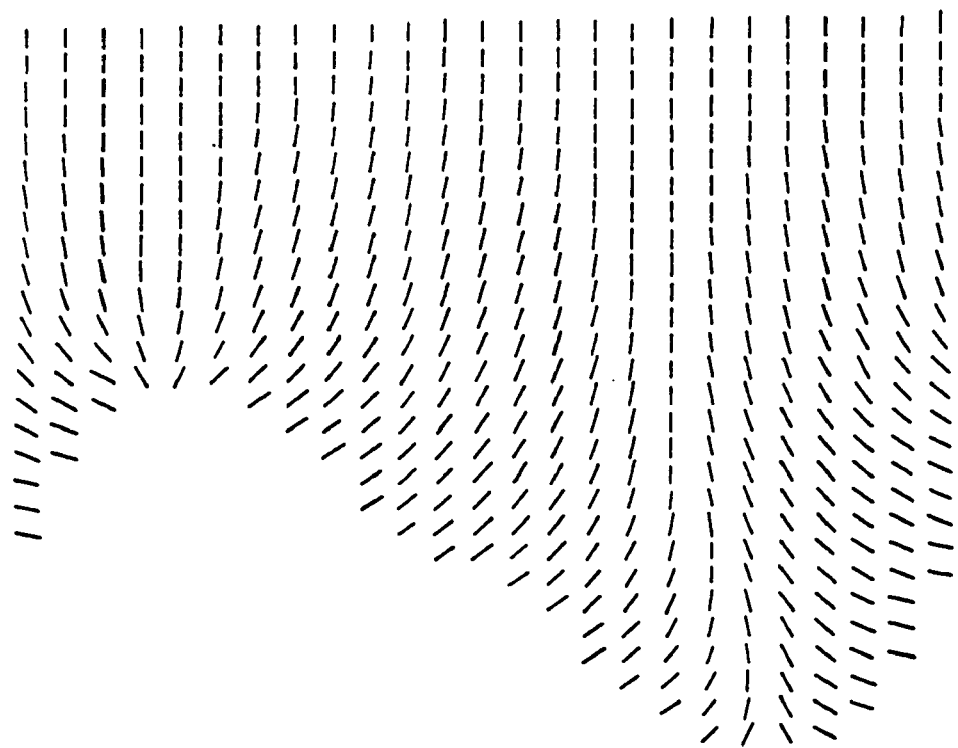
FIG. 4 is a cross section of the liquid crystal director configuration on the grating surface which leads to a higher pretilt.
Figure 5:
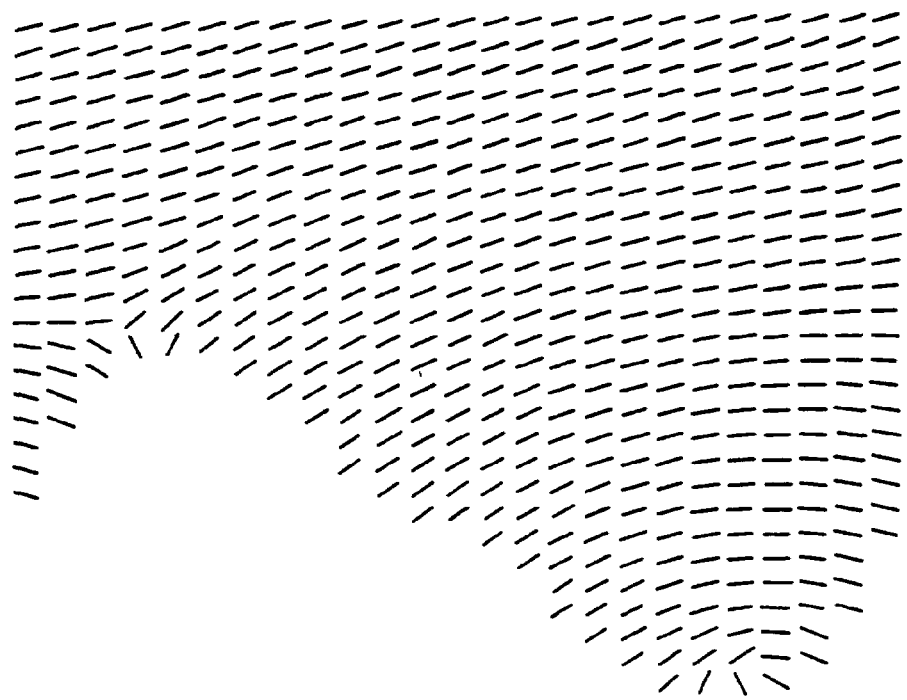
FIG. 5 is a cross section of the liquid crystal director configuration on the grating surface which leads to a lower pretilt.
Figure 6:
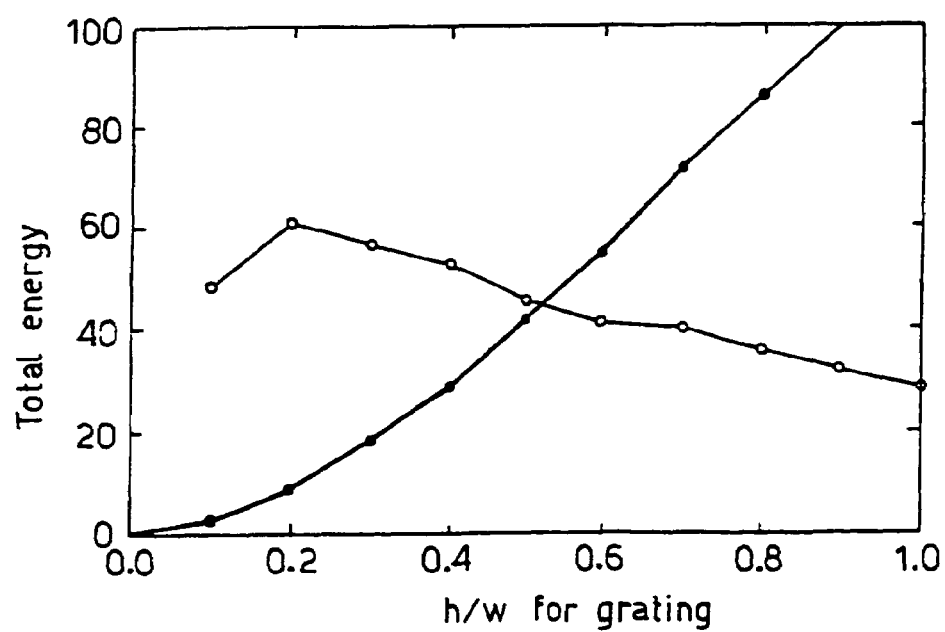
FIG. 6 is the energy of the two pretilt configurations as a function of groove depth to pitch ratio (h/w).

Finite element analysis has been carried out in order to predict the molecular (more correctly the director) configuration of a free layer of nematic material on such grating surfaces. The results are shown in FIGS. 4, 5 and 6 where the short lines represent liquid crystal director throughout the layer thickness, with the envelope of the short lines at the bottom showing the grating profile. In this case the grating surface has been described by the function;

$$y(x) = \frac{h}{2}\sin\left(\frac{2\pi x}{w} \div A\sin\left(\frac{2\pi x}{w}\right)\right) \quad (2)$$

where h is the groove depth, w is the pitch and A is an asymmetry factor. In FIGS. 4 and 5, A=0.5 and h/w=0.6. In FIG. 4, the finite element grid has been allowed to relax from an initial director tilt of 80°. In this case the configuration has relaxed to a pretilt of 89.5°. However, if the initial director tilt is set to 30° then the grid relaxes to a pretilt of 23.0° as shown in FIG. 5. Therefore the nematic liquid crystal can adopt two different configurations depending on starting conditions.

In practice a nematic liquid crystal material will relax to whichever of these two configuration has the lowest overall distortion energy. FIG. 6 shows the total energy (arbitrary units) of the high pretilt (solid circles) and the low pretilt (empty circles) state verses the groove depth to pitch ratio (h/w). For low h/w, the high pretilt state has the lowest energy and so the nematic will adopt a high pretilt state. Conversely for large h/w, the low pretilt state has the lowest energy and so this state is formed. However when h/w=0.52, the states have the same energy and so either can exist without relaxing into the other. Therefore if a surface is fabricated at, or close to this condition, then bistability can be observed in the pretilt. With reference to the above fabrication details, an exposure time of 80 seconds was found to lead to a bistable surface. In this case the bistability is purely a function of the surface and does not rely on any particular cell geometry. In this sense it is distinct from prior art such as U.S. Pat. No. 4,333,708 (1982).

One suitable cell configuration to allow switching between the bistable states is shown in FIG. 7 which is a stylised cross section of the device in which a layer 2 of nematic liquid crystal material with positive dielectric anisotropy is contained between a bistable grating surface 25 and a monostable homeotropic surface 26. The latter surface 26 could, for example, be a flat photoresist surface coated with lecithin. Within this device liquid crystal molecules can exist in two stable states. In state (a) both surfaces 25, 26 are homeotropic whereas in (b) the grating surface 25 is in its low pretilt state leading to a splayed structure. For many nematic materials, a splay or bend deformation will lead to a macroscopic flexoelectric polarization which is represented by the vector P in FIG. 7. A dc pulse can couple to this polarisation and depending on its sign will either favour or disfavour configuration (b).

With the device in state (a), the application of a positive pulse will still cause fluctuations in the homeotropic structure despite the positive dielectric anisotropy. These fluctuations are sufficient to drive the system over the energy barrier that separates the two alignment states. At the end of the pulse the system will fall into state (b) because the sign of the field couples favourably with the flexoelectric polarisation. With the system in state (b), a pulse of the negative sign will once again disrupt the system but now it will relax into state (a) as its sign does not favour the formation of the flexoelectric polarisation. In its homeotropic state, the bistable surface is tilted at slightly less than 90° (e.g. 89.5°). This is sufficient to control the direction of splay obtained when the cell switches into state (b).

One particular cell consisted of a layer of nematic ZLI2293 (Merck) sandwiched between a bistable grating surface and a homeotropic flat surface. The cell thickness was 3 µm. Transmission was measured through the cell during the application of dc pulses at room temperature (20° C.). The polariser and analyser 13, 13' on each side of the cell 1 were crossed with respect to each other and oriented at ±45° to the grating grooves. In this set up, the two states in FIG. 7, (a) and (b), appear black and white respectively when addressed as follows.

FIG. 8 shows the applied voltage pulses (lower trace) and the optical response (upper trace) as a function of time. Each pulse had a peak height of 55.0 volts and a duration of 3.3 ms. Pulse separation was 300 ms. With the first application of a positive pulse, the transmission changes from dark to light indicating that the cell has switched from state FIG. 7(a) to state (b). A second positive pulse causes a transient change in transmission due to the rms effect of coupling to the positive dielectric anisotropy causing a momentary switching of the bulk material to state (a). However, in this case the cell does not latch at the surface and so remains in state (b). The next pulse is negative in sign and so switches the cell from state (b) to state (a). Finally a second negative pulse leaves the cell in state (a). This experiment shows that the cell does not change state on each pulse unless it is of the correct sign. Thus it proves that the system is bistable and that the final state can be reliably selected by the sign of the applied pulse.

The switching occurs across a wide temperature range. As the temperature is increased the voltage required for switching falls. For example at 30° C., a voltage of 44.8 V is required for bistable switching whereas at 50° C. the voltage in only 28.8 V. Similarly, for a fixed voltage the required pulse length for latching decreases with temperature.

After this data was taken, the cell was dismantled and the grating surface as characterised by AFM (atomic force microscopy). An asymmetric modulation was confirmed which was fitted by equation 2 to give a pitch of 1 µm, a groove depth of 0.425 µm (h/w=0.425) and an asymmetry factor of A=0.5. In comparison to the results in FIG. 6, this grating has its bistable regime at a lower value of h/w (0.425 compared to 0.52). However equation 2 was not a precise fit to the AFM data due to the real surface possessing steeper facet angles which require the addition of higher harmonics in the description. Other effects such as AFM tip radius also need to be considered for a more accurate comparison. Thus it can be concluded that the measured surface modulation is similar to the predicted regime for bistability.

Figure 9:
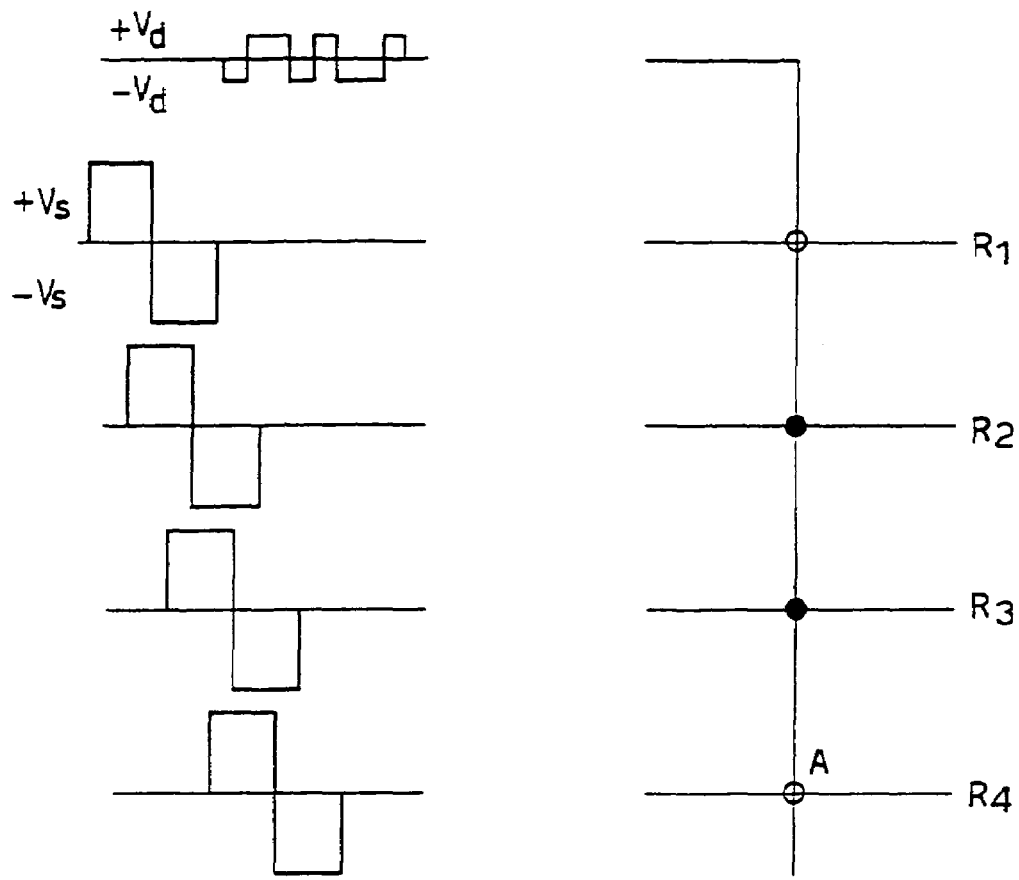
FIG. 9 shows an example multiplexing scheme for the bistable device.
Figure 9:
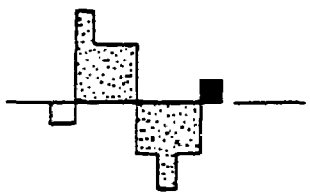

The successful switching of a single pixel allows the design of a suitable multiplexing method for the selection of several adjacent pixels. FIG. 9 shows one particular example of such a scheme. As shown pixels in four consecutive rows R1, R2, R3, R4 in one column are to be switched. Two possible alignment states may be arbitrarily defined as ON and OFF states. Rows R1 and R4 are to switched to an ON state, rows R2 and R3 are in the OFF state. Strobe pulses of $+V_s$ for three time slots followed by $-V_s$ for 3 time slots (ts) are applied to each row in turn. A data waveform is applied to the column as shown and comprises a $-V_d$ for 1 ts followed by a $+V_d$ for 1 ts for and ON pixel, and $-V_d$ for 1 ts followed by $+V_d$ for 1 ts for and OFF pixel.

Now considering one particular pixel at A. The resultant waveform consists of large positive and negative pulses which disrupt the nematic orientation and raises its energy up to the barrier that separates the two bistable surface states. In this field applied conditon, the liquid crystal molecules align along the electric field as in conventional monostable nematic devices, and as shown in FIG. 7a. These large 'reset' pulses of opposite polarity are followed immediately by a smaller pulse which is still large enough to dictate the final selection state of the pixel during the relaxation of the orientation. Electrical balance is achieved by a small pulse of polarity opposite to the switching pulse and preceding the two large pulses. Alternatively, polarity inversion in adjacent display address time may be used.

The above bistable device achieves final state selection by virtue of the flexoelectric polarisation in one state. Therefore this configuration must contain splay. In the experimental example only one surface is allowed to switch but working devices can also be made in which both surfaces switch. The only remaining constraint is that the low pretilt states on each surface should differ in value so that a finite splay remains. However even if the low pretilt states are equal, the cell can still be switched if it contains a two frequency nematic material, that is a material whose dielectric anisotropy is positive at low frequencies and negative at high frequencies. An example of such a material is TX2A (Merck) which has a crossover frequency of 6 kHz. FIG. 9 shows a cross section of this configuration. With the cell in state (a), the application of a high frequency signal drives the bulk of the nematic to a low pretilt. The surfaces follow and so the cell switches to state (b). Conversely a low frequency signal will drive the nematic to a high pretilt and so the cell will switch to state (a).

EXAMPLE 2

A second example of a bistable device is now described. A piece of ITO coated glass to form the cell wall was cleaned with acetone and isopropanol and was then spin coated with photoresist (Shipley 1813) at 3000 rpm for 30 seconds giving a coating thickness of 1.5 µm. Softbaking was then carried out at 90° C. for 30 minutes.

A contact exposure was then carried out using a chrome mask containing 0.5 µm lines and 0.5 µm gaps (hence an overall pitch of 1 µm). In this example the exposure was carried out at normal incidence. Exposure in this geometry leads to a symmetric intensity distribution and therefore a symmetric grating profile. Samples were exposed to light from a mercury amp (Osram Hg/100) with an intensity of 0.8 mW/cm$^2$.

After the exposure the sample was released from the mask and developed in Shipley MF319 for 20 seconds followed by a rinse in de-ionised water. This left the sample patterned with a symmetric surface modulation. The photoresist was then hardened by exposure to deep UV radiation (254 nm) followed by baking at 160° C. for 45 minutes. This was done to ensure insolubility of the photoresist in the liquid crystal. Finally the grating surface is treated with a solution of a chrome complex surfactant in order to induce a homeotropic boundary condition.

One particular surface was made using the above method with an exposure time of 360 s. AFM analysis on this grating showed it to have a symmetric profile with a pitch of 1 µm and a depth of 1.2 µm. This surface was constructed opposite a flat homeotropic surface to form a call with a thickness of 2.0 µm. The cell was filled with the nematic material E7 (Merck) in the isotropic phase followed by cooling to room temperature. Microscopic observation revealed a mixture of both bistable states, shown as (a) and (b) in FIG. 7.

The cell was oriented between crossed polarisers so that the groove direction was at 45° to the polariser directions. Thus state (a) was the bright state while state (b) was the dark state. Monopolar pulses of alternating sign were then applied to the cell. The pulse length was set to 5.4 ms with a 1 s pulse separation. Full switching occurred between state (a) and (b) when the peak voltage of the applied pulses was increased to 20.3 V. Pairs of pulses were also applied to the cell in a similar manner to the data shown in FIG. 8. Once again only the first pulse changed the state of the system while the second pulse only induced a non-latching transient response. In this case the optical response times were also measured. The 10%-90% response time for switching from (a) to (b) was 8.0 ms while the response time for switching from (b) to (a) was 1.2 ms. Further analysis of this cell revealed that the bistable states (a) and (b) induced pretilts of 90° and 0° respectively on the grating surface. Thus this sample has demonstrated the maximum possible change in pretilt.

The optics of the configurations shown in FIGS. 7 and 10 is optimised when the cell thickness d is given by:—

$$d = \frac{\lambda}{2\Delta n_{av}} \quad (3)$$

where $\lambda$ is the operating wavelength and $\Delta n_{av}$ is the average value of the in-plane component (parallel to the cell walls) of the nematic birefringence. $\Delta n_{av}$ will be larger for the configuration shown in FIG. 10 compared to FIG. 7, hence the cell thickness can be less and therefore the optical switching speed will be larger. However the use of a two frequency nematic limits the choice of available materials, also leads to a more complex addressing scheme, but may allow lower voltage operation.

EXAMPLE 3

Figure 11A:
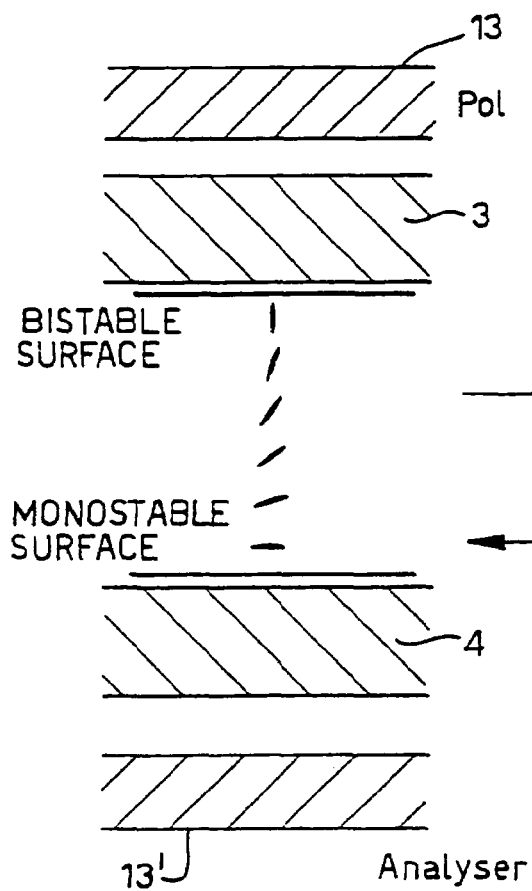
FIG. 11 shows a cell configuration for bistable switching between a non-twisted and a twisted state.
Figure 11B:
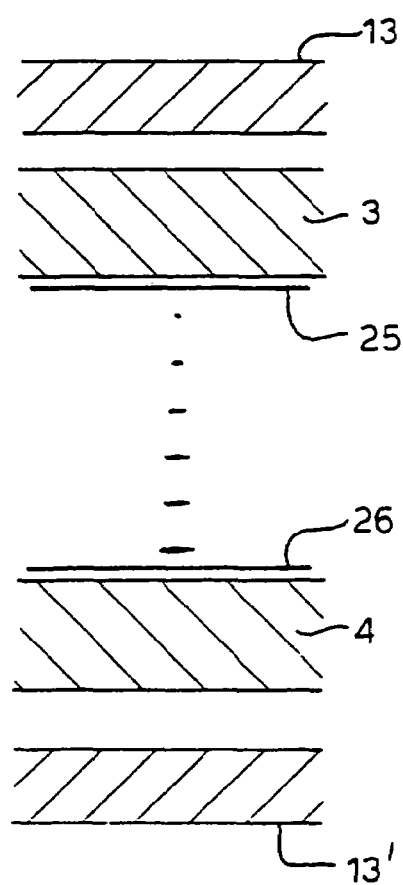
Figure 11B:
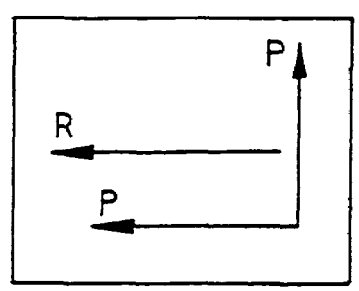

The bistable grating surface can also be constructed opposite a planar surface. One such cell consisted of a grating with the same profile to that described in example 2. This was constructed opposite a rubbed polymer surface formed using a layer of PI32 polyimide (Ciba Geigy). The rubbing direction on the polyimide surface was set parallel to the grating groove direction on the grating surface. The cell gap was set to 2.5 µm and nematic E7 was used to fill the cell. Cooling to room temperature after filling revealed two states which are shown schematically in FIG. 11. This Figure differs from FIG. 7 in that the groove direction on the bistable surface is now in the plane of the page (in an x,y plane). Thus the 90° pretilt state on the grating forms the hybrid structure shown in (a') while the 0° pretilt state on the grating forms the twisted structure shown in (b'). To achieve optical contrast between the states, the cell was placed in-between crossed polarisers 13, 13' oriented so that the grating grooves (and rubbing direction) were parallel to one polariser, although the polarisers may be rotated to optimise contrast in the two switch states. Thus state (b') was the bright state while state (a') was the dark state. Using 5.3 ms monopolar pulses, switching between (a') and (b') occurred at a peak voltage of 56.7 V. The optical response times were 110 ms for switching from (a') to (b') and 1.4 ms for switching from (b) to (a').

The bright state (b') has a bulk twist of 90°. As with conventional TN structures, the maximum transmission is obtained when N is an integer where (C. H. Gooch and H. A. Tarry, J. Phys. D: Appl. Phys., 8 1575 (1975));

$$N = \sqrt{(\Delta nd/\lambda)^2 + 0.25} \quad (4)$$

where $\Delta n$ is the nematic birefringence, d is the cell gap and $\lambda$ is the operating wavelength. Therefore a bistable device using E7 ($\Delta n=0.22$) with an operating wavelength of 530 nm and N=1 will have a cell gap of 2.1 µm.

In comparison the configuration described in example 2 has an optimum thickness given by equation 3. For that example, $\Delta n_{av}$ is $\Delta n/2$ therefore equation 3 gives a thickness of 1.2 µm. Thus the bistable device without twist will always possess optimum optics at a thinner cell gap and will therefore switch at lower voltages with a shorter optical response time.

A cholesteric dopant (eg <1% of CB15 Merck) may be added to prevent twist disclinations. Alternatively these disclinations may be prevented by arranging the groove directions non parallel to the rubbing alignment directions, eg about 5° adjustment.

The grating surfaces for these devices can be fabricated using a variety of techniques as listed earlier. The homeotropic treatment can be any surfactant which has good adhesion to the grating surface. This treatment should also lead to an unpinned alignment. That is, an alignment which favours a particular nematic orientation without inducing rigid positional ordering of the nematic on the surface.

As seen from the above analysis, the grating modulation has to possess a certain h/w for a given asymmetry for bistability to exist. The absolute scale of the modulation is limited by other factors. If the groove depth and pitch are too large then diffractive effects will be significant and lead to loss of device throughput. Furthermore if the groove depth is similar to the cell thickness then the proximity of the groove peaks to the opposite flat surface may inhibit bistable switching. If two gratings are required as in the device shown in FIG. 10 then a large groove depth compared to cell thickness would inevitably lead to switching which depends on the phase of the two modulations. This would severely complicate the device manufacturing process.

Problems also exist if the groove depth and pitch are too small. For a constant h/w, as the pitch becomes smaller the energy density of the bulk distortion at the surface becomes larger. Eventually this energy is similar to the local anchoring energy of the nematic on the surface. Thus the structures shown in FIGS. 4 and 5 (which assume an infinite anchoring energy) would no longer be obtained and bistability would inevitably be lost. Typical values of h and w are, about 0.5 µm and 1.0 µm in a range of about 0.1 to 10 µm and 0.05 to 5 µm respectively.

Small amounts e.g. 1-5% of a dichroic dye may be incorporated into the liquid crystal material This may be used with or without a polariser, to provide colour, to improve contrast, or to operate as a guest host type device; e.g. the material D124 in E63 (Merck). The polariser(s) of the device (with or without a dye) may be rotated to optimise contrast between the two switched states of the device.

The invention claimed is:

1. A bistable nematic liquid crystal device comprising;
    a first cell wall and a second cell wall, said first cell wall and said second cell wall enclosing a layer of liquid crystal material,
    wherein said first cell wall has a first surface treated to provide a bistable pretilt to molecules of liquid crystal material,
    where in a first stable state, liquid crystal molecules have one pretilt zenithal angle from the first surface, and in a second stable state, liquid crystal molecules have a second different pretilt zenithal angle from the first surface,
    wherein said second cell wall has a first surface treated to provide monostable alignment to molecules of liquid crystal material, and wherein the first and second stable states of said bistable nematic liquid crystal device correspond to stable and optically distinguishable liquid crystal configurations.

2. A device according to claim 1 wherein the first surface of the second cell wall is treated with one of a planar, a degenerate planar or a homeotropic surface treatment.

3. A device according to claim 1 wherein said layer of liquid crystal material comprises a nematic liquid crystal material.

4. A device according to claim 1 wherein said layer of liquid crystal material comprises a long pitch cholesteric liquid crystal material.

5. A device according to claim 1 wherein the first surface of the first cell wall comprises a plurality of pillars.

6. A device according to claim 5 wherein the height of each of said plurality of pillars is within the range of 1-3 µm.

7. A device according to claim 5 wherein the width of each of said plurality of pillars is within the range of 5-50 µm.

8. A device according to claim 5 wherein the width of each of said plurality of pillars is greater than 50 µm.

9. A device according to claim 5 and further comprising a plurality of beads dispersed in said layer of liquid crystal material.

10. A bistable nematic liquid crystal device comprising;
a first cell wall and a second cell wall, said first cell wall and said second cell wall enclosing a layer of liquid crystal material,
wherein said first cell wall has a first surface treated to provide two different pretilt zenithal angles from the first surface to molecules of liquid crystal material,
wherein said second cell wall has a first surface treated to provide monostable alignment to molecules of liquid crystal material, and
wherein said bistable nematic liquid crystal device provides two stable and optically distinguishable liquid crystal configurations.

11. A cell wall for a bistable nematic liquid crystal device, said cell wall having a first surface with a patterned surface profile to provide two different pretilt zenithal angles from the first surface in the same azimuthal plane to molecules of liquid crystal material,
wherein said patterned surface profile comprises at least one pillar, and
wherein the first surface provides the bistable nematic liquid crystal device two stable and optically distinguishable liquid crystal configurations.

12. A device including a cell wall according to claim 11 wherein the height of each of said plurality of pillars is within the range of 1-3 µm.

13. A device including a cell wall according to claim 11 wherein the width of each of said plurality of pillars is within the range of 5-50 µm.

14. A device including a cell wall according to claim 11 wherein the width of each of said plurality of pillars is greater than 50 µm.

15. A device including a cell wall according to claim 11 wherein said pillars are embossed.

16. A liquid crystal device providing two stable and optically distinguishable liquid crystal configurations, said device comprising a cell wherein said cell has a cell wall according to claim 11.

17. A liquid crystal device being latchable between a first stable liquid crystal configuration and a second stable liquid crystal configuration, said first stable liquid crystal configuration being optically distinguishable from said second stable liquid crystal configuration, said device comprising a cell, said cell having at least one cell wall having a first surface that provides two different pretilt angles in the same azimuthal plane to molecules of liquid crystal material, wherein said first stable liquid crystal configuration is a twisted molecular configuration.

18. A device according to claim 17 wherein said second stable liquid crystal configuration is a non twisted molecular configuration.

19. A device according to claim 17 wherein said molecules of liquid crystal material exhibit positive dielectric anisotropy.

20. A device according to claim 17 wherein said molecules of liquid crystal material exhibit negative dielectric anisotropy.

21. A device according to claim 17, wherein the first surface provides two different surface-stabilized pretilt angles.

* * * * *